United States Patent [19]

Dabrowski

[11] 4,150,218

[45] Apr. 17, 1979

[54] SEPARATION OF COPPER IONS FROM MIXTURES THAT INCLUDE COPPER AND AN AMINE

[75] Inventor: John E. Dabrowski, Lawrenceville, N.J.

[73] Assignee: General Electric Company, Pittsfield, Mass.

[21] Appl. No.: 863,415

[22] Filed: Dec. 22, 1977

[51] Int. Cl.$^2$ .............................................. C08G 65/46
[52] U.S. Cl. .................................... 528/482; 260/874; 423/24; 528/212; 528/215; 528/216
[58] Field of Search ............ 260/47 ET, 874; 423/24; 528/212, 215, 216, 482

[56] References Cited

U.S. PATENT DOCUMENTS

| | | | |
|---|---|---|---|
| 3,383,435 | 5/1968 | Cizek | 260/874 |
| 3,984,374 | 10/1976 | Cooper et al. | 260/47 ET |
| 4,024,107 | 5/1977 | Bennett, Jr. et al. | 260/47 ET |
| 4,071,500 | 1/1978 | Cooper et al. | 260/47 ET |

Primary Examiner—Lester L. Lee
Attorney, Agent, or Firm—Morgan, Finnegan, Pine, Foley & Lee

[57] ABSTRACT

A process is disclosed for the separation of copper from a copper-amine mixture. The process comprises contacting the copper-amine mixture with an acidic cation exchange resin in which substantially all of the acid groups have been exchanged with a metal ion that is above copper in the electromotive series.

11 Claims, No Drawings

SEPARATION OF COPPER IONS FROM MIXTURES THAT INCLUDE COPPER AND AN AMINE

This invention is concerned with a method for the separation of copper from a mixture that includes copper and an amine by contacting said mixture with an acidic cation exchange resin in which substantially all of the acid groups have been exchanged with a metal ion that is above copper in the electromotive series.

BACKGROUND OF THE INVENTION

Mixtures which include copper ions and an amine are produced in oxidative coupling reactions that are employed to produce polyphenylene oxide resins. Processes for the production of these resins are described in U.S. Pat. No. 3,306,875; U.S. Pat. No. 3,306,875; U.S. Pat. No. 3,639,656; U.S. Pat. No. 3,642,699; U.S. Pat. No. 3,733,299 and U.S. Pat. No. 3,661,848. All of these patents are incorporated herein by reference.

Generally the polymerization processes that are employed to produce polyphenylene oxides result in a complex polymerization mixture which includes polyphenylene oxide polymer, the copper-amine catalyst and the solvent. Various techniques have been employed to isolate the polymer from the reaction mixture including acid extraction of the catalyst, chelation of the catalyst and antisolvent precipitation. Generally, most prior art methods have resulted in a copper containing effluent from which it has been difficult to separate the copper ions. Attempts to use acidic ion exchange resins have been unsuccessful in separating copper ions from mixtures of copper amines. This has been experienced even when the acid ion exchange resin has been saturated with amine prior to extracting of the copper-amine mixture with the acid ion exchange resin. The applicant has discovered that it is possible to separate copper ions from mixtures that include copper and an amine if an acid ion exchange resin is employed in which the acid groups have been replaced with a metal that is above copper in the electromotive series. This process results in a copper containing ion exchange resin that may be regenerated in a two step process with an inorganic acid followed by contact with a metal ion containing solution or with a metal ion chelating agent that exchanges a metal ion above copper in the electromotive series for copper.

Accordingly, it is a primary object of this invention to provide a process for separating copper ions from a mixture that includes an amine.

DETAILED DESCRIPTION OF THE INVENTION

The process of the invention provides a method for the reduction of the amount of copper ions in a mixture that includes copper and an amine, said method comprising contacting said mixture that includes an amine with an acid ion exchange resin in which all of the acid groups have been exchanged with a metal ion that is above copper in the electromotive series to extract the copper and thereafter obtaining the mixture substantially free of copper.

The process of the invention is primarily intended for use in separating copper from reaction mixtures of polyphenylene oxides. These mixtures include polyphenylene oxide polymer, copper-amine catalyst and a solvent. The polyphenylene oxides are preferably prepared from phenolic monomers of the formula:

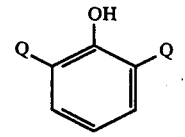

ps wherein each Q is a substituent selected from the group consisting of hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus. The preferred phenolic compound is 2,6-xylenol.

The polyphenylene oxides are of the formula:

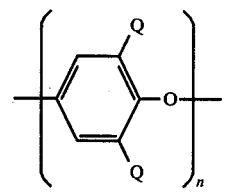

wherein each Q is a monovalent substituent selected from the group consisting of hydrogen, halogen, hydrocarbon radicals, hydrocarbonoxy radicals having at least two carbon atoms between the halogen atom and the phenyl nucleus and halohydrocarbon radicals having at least two hydrocarbon radicals between the halogen atom and the phenyl nucleus, all of said substituents being free of a tertiary carbon atom and n is a integer of at least 50.

The acid groups of the ion exchange resin may be replaced with metal ions above copper in the electromotive series such as calcium, zinc, magnesium, sodium etc. Calcium is the preferred ion as if it is incorporated into the polyphenylene oxide resin, it will not add color to the resin.

The particular ion exchange resin is not critical and one may employ an ion exchange resin that consists of sulfonated styrene-vinyl benzene beads in which the acid groups have been replaced with metal ions such as calcium. These resins are described in the Encyclopedia of Polymer Science and Technology, Vol. 7, pp. 702–704 which is hereby incorporated by reference. An example of a commercially available acidic cation exchange resin is Amberlyst 15.

The separation process may be carried out on a reaction mixture which comprises the polyphenylene oxide polymer, a copper-amine catalyst, a solvent and reaction promoter. The separation may be carried out by passing the reaction mixture through a fixed bed or a column of the metal ion containing cation exchange resin. After the reaction mixture is passed through the column, the reaction mixture may be treated with an antisolvent such as methanol to precipitate the polyphenylene oxide. The metal ion containing cation exchange resin may be washed sequentially with toluene to remove any polyphenylene oxide; with methanol to remove toluene and with an acid such as hydrochloric or acetic to remove copper.

DESCRIPTION OF THE PREFERRED EMBODIMENTS

In order that those skilled in the art may better understand the invention, the following example is given by way of illustration and not by way of limitation.

EXAMPLE

A polymerization reaction mixture containing poly(2,6-dimethyl-1,4-phenylene oxide), a copper sulfate-dibutylamine catalyst and toluene is passed through a column containing an acidic cation exchange resin.* One run is made with cation exchange resin that is exchanged with a saturated solution of calcium chloride and one with the unmodified cation exchange resin. The poly(2,6-dimethyl-1,4-phenylene oxide) was obtained from the effluent of the column by precipitation with methanol. The copper content of the polymer was as follows:

|   |   | Copper (ppm) |
|---|---|---|
| A | CaCl$_2$ Exchange Column | 310 |
| B** | Unmodified Exchange Column | 920 |
| C** | Untreated Reaction Mixture | 700 |

*Amberlyst 15, Rohm and Haas
**Control

The column of A was washed first with toluene to remove any residual poly(2,6-dimethyl-1,4-phenylene oxide), secondly with methanol to remove the toluene and thirdly with dilute aqueous hydrochloric acid to remove the copper. The copper content of each wash liquid was as follows:

|   | Copper |
|---|---|
| toluene wash | 0.5 ppm |
| methanol wash | 10.0 ppm |
| acid wash | 195.0 ppm |

Although the above example has shown various modifications and variations of the present invention, other modifications and variations are possible in light of the above teaching. It is therefore to be understood that changes may be made in the particular embodiments of the invention described which are within the full intended scope of the invention.

I claim:

1. A method for the reduction of copper ions in a mixture that inludes copper and amine, said method comprising contacting said mixture that includes copper and an amine, with a cation exchange resin in which substantially all of the acid groups have been exchanged with a metal ion that is above copper in the electromotive series, to extract the copper and thereafter obtaining the mixture substantially free of copper.

2. A method as defined in claim 1 wherein the mixture that includes copper and an amine is the polymerization mixture that is obtained by the oxidative coupling of a phenolic monomer in the presence of a complex copper-amine catalyst.

3. The method of claim 2 wherein the phenolic monomer is of the formula:

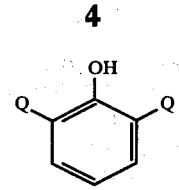

wherein each Q is a monovalent substituent selected from the group consisting of hydrogen, halogen, hydrocarbon radicals, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus, all of said substituents being free of a tertiary carbon atom.

4. The method of claim 3 wherein substantially all of the acid groups of the acid cation exchange resin have been exchanged with calcium ions.

5. A method as defined in claim 4 wherein the polymerization mixture is obtained from the oxidative coupling of 2,6-xylenol.

6. A method as defined in claim 5 wherein the ion exchange resin is a sulfonated styrene-divinyl benzene resin.

7. A method as defined in claim 1 including the step of regenerating the copper containing ion exchange resin by contact with an acid.

8. A method for reducing the copper content of a polyphenylene oxide reaction mixture which comprises a polyphenylene oxide polymer, a complex copper-amine catalyst and a solvent, said method comprising contacting said reaction mixture with an acidic cation exchange resin in which substantially all of the acid groups have been exchanged for calcium ions and thereafter obtaining a mixture which comprises a polyphenylene oxide, an amine and a solvent.

9. A mthod as defined in claim 8 wherein the polyphenylene oxide is of the formula:

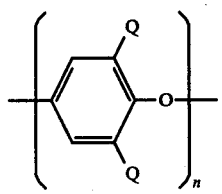

wherein each Q is a monovalent substituent selected from the group consisting of hydrogen, halogen, hydrocarbon radicals, halohydrocarbon radicals having at least two hydrocarbon atoms between the halogen atom and the phenyl nucleus, hydrocarbonoxy radicals and halohydrocarbonoxy radicals having at least two carbon atoms between the halogen atom and the phenyl nucleus, all of said substituents being free of a tertiary carbon atom and n is an integer of at least 50.

10. A method as defined in claim 9 wherein said polyphenylene oxide is poly(2,6-dimethyl-1,4-phenylene oxide).

11. A method as defined in claim 10 including the step of precipitating the poly(2,6-dimethyl-1,4-phenylene oxide) with an antisolvent.

* * * * *